United States Patent [19]
Otto

[11] Patent Number: 5,813,675
[45] Date of Patent: Sep. 29, 1998

[54] MULTIBARRIER SEAL

[75] Inventor: Dennis L. Otto, Malvern, Ohio

[73] Assignee: The Timken Company, Canton, Ohio

[21] Appl. No.: 730,445

[22] Filed: Oct. 15, 1996

Related U.S. Application Data

[63] Continuation-in-part of Ser. No. 551,159, Oct. 31, 1995, abandoned.

[51] Int. Cl.[6] .................................................... F16J 15/32
[52] U.S. Cl. ...................... 277/549; 277/407; 277/562; 277/572
[58] Field of Search ................................ 277/37, 38, 95, 277/152, 153; 384/482, 484, 485, 486

[56] References Cited

U.S. PATENT DOCUMENTS

| | | | |
|---|---|---|---|
| 3,022,081 | 2/1962 | Kosatka ................................... | 277/153 |
| 3,510,138 | 5/1970 | Bowen et al. ........................... | 277/153 |
| 4,212,557 | 7/1980 | Overbeek . | |
| 4,273,460 | 6/1981 | Ueno . | |
| 4,285,526 | 8/1981 | Klinteberg et al. ..................... | 277/153 |
| 4,293,061 | 10/1981 | Brown . | |
| 4,434,985 | 3/1984 | Sonnerat . | |
| 4,516,783 | 5/1985 | Mitsue et al. . | |
| 4,625,846 | 12/1986 | Gomez . | |
| 4,627,512 | 12/1986 | Clohessy . | |
| 4,721,312 | 1/1988 | Hornberger .............................. | 277/37 |
| 4,799,808 | 1/1989 | Otto . | |
| 4,928,804 | 5/1990 | Wakabayashi . | |
| 4,958,942 | 9/1990 | Shimizu ................................... | 384/486 |
| 4,960,192 | 10/1990 | Kurihara . | |
| 4,962,936 | 10/1990 | Matsushima ............................. | 277/37 |
| 4,968,044 | 11/1990 | Petrak . | |
| 5,022,659 | 6/1991 | Otto . | |
| 5,024,449 | 6/1991 | Otto . | |
| 5,037,214 | 8/1991 | Dougherty . | |
| 5,085,304 | 2/1992 | Barroso . | |
| 5,096,207 | 3/1992 | Seeh et al. . | |
| 5,129,744 | 7/1992 | Otto et al. . | |
| 5,141,088 | 8/1992 | Kurihara et al. . | |
| 5,148,901 | 9/1992 | Kurihara et al. . | |
| 5,183,269 | 2/1993 | Balck et al. . | |
| 5,201,529 | 4/1993 | Heinzen . | |
| 5,261,752 | 11/1993 | Ouchi et al. ............................. | 384/484 |
| 5,353,890 | 10/1994 | Clohessy . | |
| 5,407,213 | 4/1995 | Ouchi et al. . | |
| 5,458,420 | 10/1995 | Otto . | |

FOREIGN PATENT DOCUMENTS

| | | |
|---|---|---|
| 0286151 | 10/1988 | European Pat. Off. . |
| 0321200 | 6/1989 | European Pat. Off. . |
| 337893 | 10/1989 | European Pat. Off. . |
| 532011 | 3/1993 | European Pat. Off. . |
| 0556494 | 8/1993 | European Pat. Off. . |

*Primary Examiner*—Randolph A. Reese
*Assistant Examiner*—John L. Beres
*Attorney, Agent, or Firm*—Polster, Lieder, Woodruff & Lucchesi, L.C.

[57] ABSTRACT

A multibarrier seal having outer and inner cases fitted to the outer and inner races of a bearing respectively. The outer case carries a primary lip which bears against an axial wall on the inner case. The inner case carries a secondary lip which bears against an axial wall on the outer case. The outer case also carries a tertiary lip which bears against a radial sealing surface which may be on a carrier fitted to the inner case. All three lips are inclined with respect to the surfaces against which they bear, and have back faces which are presented away from the interior of the bearing. Initially atmospheric air bears against the back face of the primary lip and urges it with greater force against the axial wall of the inner case to hold a vacuum within the interior of the bearing. Should the primary lip fail, the secondary lip will serve to hold the vacuum in the same way, with atmospheric air urging it with greater force against the axial wall of the outer case. Should the secondary lip fail, the tertiary lip will hold the vacuum with atmospheric pressure urging it with greater force against the sealing surface. The multibarrier seal establishes a formidable obstacle to the entry of contaminants into the bearing and is useful for sealing a bearing operated in hostile environments, even in the absence of pressure differentials.

22 Claims, 2 Drawing Sheets

MULTIBARRIER SEAL

CROSS-REFERENCE TO RELATED APPLICATIONS

This application is a continuation-in-part of pending U.S. patent application Ser. No. 08/551,159 entitled BEARING SEAL CAPABLE OF HOLDING A VACUUM, filed Oct. 31, 1995 now abandoned.

STATEMENT REGARDING FEDERALLY SPONSORED RESEARCH OR DEVELOPMENT

Not Applicable

BACKGROUND OF THE INVENTION

This invention relates in general to seals and more particularly to a seal that establishes multiple dynamic barriers between machine components, one of which rotates relative to the other, so as to isolate a region between the components, and also to a bearing that operates with such a seal.

The interiors of traditional antifriction bearings operate at essentially the same pressure as the surrounding environment, and well they should for the seals which isolate the interior of the bearing include vents. Thus, no pressure differential of any significance should occur across those seals. Indeed, if the interior of such a bearing was to exist at an elevated pressure, the lubricant for the bearing will tend to exude past the venting seals. On the other hand, if the interior were at a negative pressure, contaminants might migrate past the venting seals and into the interior, perhaps damaging the raceways and rolling elements. Moreover, a pressure differential would impose forces on surfaces of the seals, and where those surfaces lie along elastomeric seal lips, the lips might bear with excessive force on the sealing surfaces along which they establish fluid barriers, resulting in increased friction and heat. The heat may be enough to cause the elastomer to take on a set and thereby deprive it of its sealing capabilities.

But some bearing seals must operate with pressure differentials across them. For example, some four wheel drive vehicles rely on partial vacuums to engage the normally nondriven wheels with drive axles, with that engagement occurring in the region of the wheel hubs, which are in turn supported by bearings. The seals which isolate the interiors of the bearings from the surrounding environment see the reduced pressure of the partial vacuum. Actually, only the seal at one end of such a bearing is exposed directly to the region of reduced pressure, but the pressure differential affects the seals at both ends.

Apart from that, some seals operate in hostile environments and must have the capacity to protect the bearing interiors isolated by them from the contaminants in such environments. The seals for the bearings at the road wheels of four wheel drive vehicles are representative. Generally speaking, a seal that establishes only a single dynamic fluid barrier at the end of such a bearing does not provide adequate protection. Multiple dynamic barriers are required.

BRIEF SUMMARY OF THE INVENTION

The present invention resides in a seal having multiple lips or other configurations which establish dynamic fluid barriers and provide good protection for the interior of a bearing or any other isolated region. Thus it is well-suited for use in hostile environments. It prevents the ingress of contaminants into a bearing or other area isolated by it and has robust lips, each of which has the capacity to hold a partial vacuum. The invention also resides in a bearing that operates and has at least one of its ends closed with the seal. The interior of the bearing may exist at a partial vacuum, which the seal holds.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Figure 1:
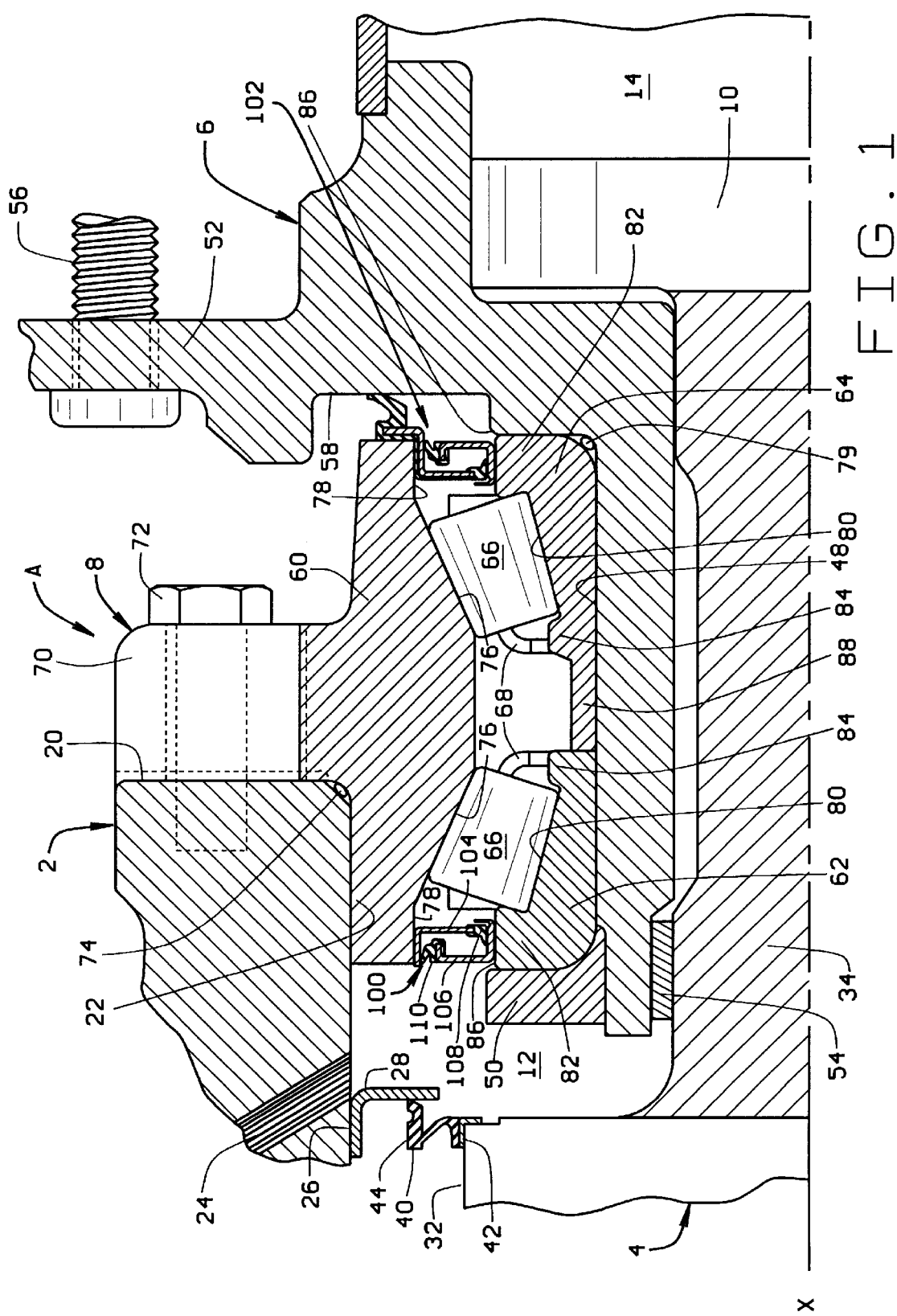
FIG. 1 is a one-half sectional view taken along the axis of rotation for a bearing fitted with a seal constructed in accordance with and embodying the present invention.

Referring now to the drawings, an assembly A (FIG. 1) for mounting a road wheel of an automotive vehicle on the chassis of the vehicle basically includes a steering knuckle 2 which is attached to the chassis, a drive axle 4 which extends through the knuckle 2, a hub 6 which fits around the axle 4 and is bolted to the road wheel, and an antifriction bearing 8 which is attached to the knuckle 2 and receives the hub 6 and axle 4, enabling them to rotate with minimum friction within the knuckle 2 about an axis x. The axle 4 and hub 6 may rotate independently of each other, but may be engaged for operation in unison. To this end, the assembly A includes clutch 10 for engaging the axle 4 with the hub 6 or disengaging the two, and the clutch 10 is controlled with air pressure. At the inboard end of the bearing 8, an annular chamber 12 lies between the knuckle 2 and the axle 4, and this chamber 12 is in communication with the clutch 10 which is located in another sealed chamber 14 at the other end of the assembly A. When the chamber 12 is placed at a pressure somewhat below atmospheric, the clutch 10 sees the reduced pressure and is engaged, but when the chamber 12 is at atmospheric pressure, the clutch 10 is disengaged. The clutch 10 does not form part of the present invention, but U.S. Pat. Nos. 4,960,192, 5,085,304 and 5,353,890 show typical clutches.

The steering knuckle 2 is coupled to the chassis through suitable links and pivots so that it is capable of moving upwardly and downwardly with respect to the chassis and further rotating about a generally vertical axis. It has a flat end face 20 at its outboard end and contains a through bore 22 which opens out of the end face 20. The vacuum chamber 12 lies generally within the inboard end of the bore 22 and communicates with a vacuum pump through a vacuum passage 24 that extends obliquely through the knuckle 2. At its inboard end, the bore 22 is fitted with a rigid seal ring 26 having an inwardly directed flange 28. Actually, the ring 26 is pressed into the end of the bore 22, and as a consequence of the interference fit, a static fluid barrier exists between the knuckle 2 and the ring 26.

The drive axle 4 has a cylindrical surface 32 which is somewhat smaller than the through bore 22 of the knuckle 2 and a reduced spindle 34 at its outboard end. The cylindrical surface 32 extends into the bore 22, but occupies only the very end of the bore 22—the inboard end. The spindle 34 extends through the remainder of the bore 22 and beyond, its end being coupled to the clutch 10.

Actually, the spindle 34 projects from a shoulder on the axle 4, and here the axle 4 is fitted with a vacuum seal 40 having a rigid case 42 and an elastomeric seal element 44 bonded to the case 42. The case 42 is pressed over the cylindrical surface 32 of the axle 4 and against the shoulder, the interference fit so formed providing a static fluid barrier between the case 42 and the axle 4. The seal element 44 has a lip which bears against the flange 28 of the seal ring 26, thereby establishing a dynamic fluid barrier with the seal ring 26. The seal 40 and seal ring 26 close one end of the vacuum chamber 12.

The hub 6 fits around the spindle 34 of the axle 4 and has a reduced cylindrical surface 48 which extends toward the inboard end of the hub 6. Here a nut 50 engages the hub 6. At its outboard end the hub 6 has a drive flange 52 which projects outwardly well beyond the cylindrical surface 48 and the through bore 22 in the knuckle 2. Internally, the hub 6 is fitted with a bearing 54 which receives the spindle 34 of the axle 4 and enables relative rotation to occur between the axle 4 and hub 6. The drive flange 52 holds bolts 56 which project axially beyond the outboard face of the flange 52 for attaching a road wheel to the hub 6. On its inboard face, the drive flange 52 has a relatively smooth sealing surface 58 of annular configuration which lies perpendicular to the axis X and thus is directed radially. The sealing surface 58, which is machined and may be ground, faces the outboard end of the bearing 8. The clutch 10 is also coupled to the hub 6 at the outboard end of the hub 6.

The antifriction bearing 8 fits between the knuckle 2 and the hub 6, and enables the hub 6 to rotate within the knuckle 2 with minimal friction. To this end, the bearing 8 includes an outer ring or race 60, an inner race in the form of two cones 62 and 64, and rolling elements in the form of tapered rollers 66 arranged in two rows between the outer race 60 and two cones 62 and 64. The bearing 8 also has cages 68 for maintaining the proper spacing between the rollers 66 in the two rows.

The outer race 60 has a generally cylindrical outer surface, but intermediate its ends has a flange 70 which projects outwardly from that surface. One end of the outer race 60 fits into the through bore 22 of the knuckle 2 such that the flange 70 lies snugly against the flat end face 20 of the knuckle 2. Indeed, the outer race 60 is secured firmly to the knuckle 2 with machine screws 72 which pass through the flange 70 and thread into the knuckle 2. The inside corner at the inboard end of the flange 70 contains an O-ring 74 which the screws 72 compress against the end of the knuckle 2 to establish a static fluid barrier between the knuckle 2 and the outer race 60.

The outer race 60 is of course hollow, and on its inside surface has two raceways 76 which taper downwardly toward the midportion of the race 60. The raceways 76 at their large ends open into end bores 78 which in turn open out of the ends of the race 60. In effect, the outer race 60 is a so-called double cup.

The two inner races or cones 62 and 64 lie within the outer race 60 and fit over the cylindrical surface 48 of the hub 6 where they are clamped snugly together between the nut 50 and drive flange 52. At the inside corner formed by the cylindrical surface 48 and the drive flange 52 an O-ring 79 is compressed between the outboard cone 64 and the hub 6, establishing a static fluid barrier between the two.

For the most part two cones 62 and 64 are the same. Each includes a tapered raceway 80 which is presented outwardly, a thrust rib 82 at the large end of the raceway 80, and a retaining rib 84 at the small end of its raceway 80. The thrust rib 82 has a cylindrical surface 86 that leads out to the back face of the cone 62 or 64. The cone 62 resembles a conventional cone, whereas the cone 64 has an extension 88 which projects axially from its retaining rib 84. The cone 62 lies within the outer race 60 with its raceway 80 presented opposite the inboard raceway 76 of the outer race 60. The cone 64 likewise lies within the outer race 60, but its raceway 80 is opposite to the outboard raceway 76 of the outer race 60. The extension 88 on the cone 64 abuts the front face on the retaining rib 84 for the cone 62, thereby establishing a fixed distance between the raceways 80 of the two cones 62 and 64. The tapered rollers 66 occupy the annular spaces between the raceways 76 of the outer race 60 and the raceways 80 of the cones 62 and 64. As such, they are arranged in two rows—one around the cone 62 and the other around the cone 64. The tapered side faces of the rollers 66 contact and roll along the raceways 76 and 80 when the bearing 8 is in operation, whereas the large diameter end faces of the rollers 66 bear against and move along the thrust ribs 82 of the cones 62 and 64. Indeed, the thrust ribs 82 prevent the rollers 66 from being expelled from the annular space between the raceways 76 and 80. Essentially, pure rolling contact occurs between the side faces of the rollers 66 and the raceways 76 and 80.

The ends of the bearing 8 are closed by seals 100 and 102 which isolate the interior of the bearing 8, where the rollers 66 and raceways 76 and 80 are located, from the vacuum chamber 12 and from the surrounding environment. The seal 100 lies at the inboard end of the bearing 8 where it fits into the end bore 78 and around the thrust rib 82 of the inboard cone 62. As such, it is presented toward the vacuum chamber 12. The seal 102 lies at the outboard end of the bearing 8 where it fits into the other end bore 78 and around the thrust rib 82 of the outboard cone 64. It is presented toward the drive flange 52 on the hub 6 and is otherwise exposed to the surrounding environment. Yet by establishing multiple dynamic fluid barriers it prevents contaminants from entering the interior of the bearing 8.

The inboard seal 100 includes (FIG. 1) an outer case 104 which is pressed into the end bore 78 at the inboard end of the outer race 60, and an inner case 106 which is pressed over the cylindrical surface 86 on the thrust rib 82 for the inboard cone 62. The seal 100 also includes an elastomeric seal element 108 which is bonded to the outer case 104 and bears against the inner case 106 to establish a live or dynamic fluid barrier that is capable of preventing the escape of grease from the annular interior of the bearing 8. The seal element 108 also contains formations which are presented toward the interior of the bearing 8 and pump grease which encounters the element 108 back toward the rollers 66. Finally the seal 100 has another elastomeric seal element 110 bonded to the inner case 106. It bears against the outer case 104 to establish another live fluid barrier that retains grease. The seal elements 108 and 110 are configured such that they will flex in the presence of a pressure differential between the interior of the bearing 8 and the vacuum chamber 12 to in effect vent the interior of the bearing 8 into the vacuum chamber 12, so that the interior of the bearing 8 will assume essentially the same pressure as the vacuum chamber 12 when the vacuum chamber 12 is evacuated. The seal 100 forms the subject of U.S. Pat. No. 5,022,659.

Figure 2:
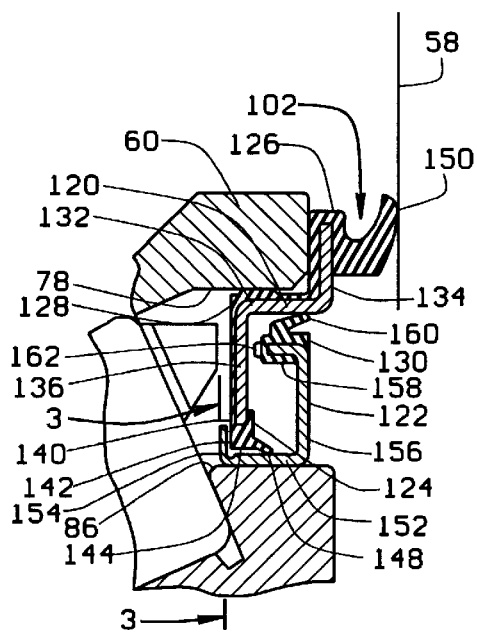
FIG. 2 is an enlarged sectional view of the seal.

The outboard seal 102, like the inboard seal 100, includes (FIG. 2) two cases—an outer case 120 which is fitted to the outer race 60 of the bearing 8 and an inner case 122 which is carried by the outboard cone 64 and rotates with it. Both cases 120 and 122 are formed from a generally rigid substance, preferably as metal stampings, and as such they possess a measure of resilience. The outer case 120 has two seal elements 124 and 126 which establish live fluid barriers along the inner case 122 and along the sealing surface 58 of the drive flange 52, respectively—fluid barriers having the capacity to hold a partial vacuum in the vacuum chamber 12. Between the two seal elements 124 and 126 lies a liner 128, which actually unites the two seal elements 124 and 126. The two seal elements 124 and 126 and the liner 128, which unites them, are molded from an elastomer that is bonded firmly to the outer case 120. The inner case 122 carries a seal element 130 which establishes a live fluid barrier with the outer case 120, and this fluid barrier likewise has the capacity to hold a partial vacuum in the vacuum chamber 12. The seal element 130 is formed from an elastomer which is bonded to the case 122.

More specifically, the outer case 120 has an axial wall 132, an outwardly directed radial wall 134 at one end of the axial wall 132, and an inwardly directed radial wall 136 at the other end of the axial wall 132. The axial wall 132 lies almost entirely within the bore 78 at the outboard end of the bearing 8, but is somewhat smaller than the diameter of the bore 78. The outwardly directed radial wall 134 lies somewhat beyond the end of the outer race 60, while the inwardly directed radial wall 136 projects inwardly toward the thrust rib 82 of the outboard cone 64 from within the bore 78.

Notwithstanding the differences in diameter between the axial wall 132 of the outer case 120 and the bore 78, the outer case 120 fits snugly within the bore 78 of the outer race 60, it being held in place by the liner 128 which exists in a state of compression between axial wall 132 and the surface of the end bore 78. As such it establishes a static fluid barrier between the axial wall 132 and the outer race 60—a barrier that is capable of holding a partial vacuum in the chamber 12. Another portion of the liner 128 exists between the outwardly directed radial wall 134 and the end face of the outer race 60 and thus prevents the wall 134 from contacting that face. This portion of the liner 128 exists in a state of compression against the end face of the outer race 60. Still another portion of the connecting element 128 lies along the inwardly directed radial wall 136 where it is presented toward the interior of the bearing 8.

Figure 3:
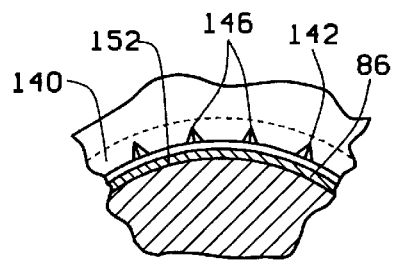
FIG. 3 is a fragmentary view of the seal taken along line 3—3 of FIG. 2.

The inner seal element 124 is bonded to the inwardly directed radial wall 136 of the outer case 120 near and along the inner edge of that wall, and it projects inwardly. It includes (FIG. 2) a pumping labyrinth 140 having an end face 142 that extends radially and is presented toward the interior of the bearing 8 to which it is exposed. The labyrinth 140 also has a circumferential face 144 which is presented inwardly toward the thrust rib 82 of the outboard cone 64. The two faces 142 and 144 meet at a circular edge. The labyrinth 140 contains wedge-shaped cavities 146 (FIG. 3) which open out of the end face 142 and the circumferential face 144 and interrupt the edge along which the faces 142 and 144 meet. The cavities 146 serve as pumping formations, in that grease which enters them while the bearing 8 is in operation is directed by their oblique surfaces back toward the interior of the bearing 8.

In addition to the labyrinth 140, the inner seal element 124 includes (FIG. 2) a primary lip 148 which is directed obliquely away from the labyrinth 140 and the interior of the bearing 8 so that its back face is normally exposed to air at atmospheric pressure. The front face of the element 124 on the other hand, is exposed to the annular interior of the bearing 8.

The outer seal element 126 for the outer case 120 is bonded to the outwardly directed radial wall 134 of the outer case 120 near and along the end edge for the case 120. It includes (FIG. 2) a tertiary lip 150 which is directed obliquely outwardly from the case 120 and at its end bears against the radial sealing surface 58 on the drive flange 52 of the hub 6. The lip 150 establishes a live fluid barrier with the surface 58. The back face of the lip 150 is exposed to the exterior environment, so that if a pressure differential exists across the seal element 126, owing to a partial vacuum in the chamber 12, the atmospheric pressure of the surrounding air will urge the lip 150 with greater force against the sealing surface 58 of the drive flange 52. The front face of the lip 150, on the other hand, is presented toward the interior of the bearing 8, but not necessarily exposed to it.

Even though the two seal elements 124 and 126 on the outer case 120 are connected by the liner 128 which extends along and is bonded to the outer case 120, the primary lip 148 of the element 124 and the tertiary lip 150 of the element 126 are independent of each other in the sense that the lips 148 and 150 flex independently. Thus, flexure of the lip 148 does not affect or disturb the flexure of the lip 150 and vice versa.

The inner seal case 122 fits around the thrust rib 82 of the outboard cone 64 and as such lies generally within the outer case 120. It includes (FIG. 2) an axial wall 152, a short radially directed wall 154 at that end of the axial wall 152 that is present toward the interior of the bearing 8, and a longer and more substantial radial wall 156 at the other end of the other end of the axial wall 152. The two radial walls 154 and 156 project outwardly and lie on opposite sides of the inwardly directed wall 136 of the outer case 120 and likewise on opposite sides of the seal element 124. The longer radial wall 156 at its outer end has an axially directed portion 158 which projects toward, but does not contact, the inwardly directed wall 136 of the outer case 120. The axial wall 152 of the inner case 122 fits over the cylindrical surface 86 of the thrust rib 82 for the outboard cone 64 with an interference fit which establishes a static fluid barrier between the inner case 122 and the thrust rib 82 of the cone 64. The fluid barrier will maintain a pressure differential created by a partial vacuum in the chamber 12.

The primary seal lip 148 on the outer case 120 at its free end bears against the axial wall 152 of the inner case 122 near the longer radial wall 156 of the inner case 122 and establishes a live fluid barrier with the inner case 122. Actually the lip 148 is molded with its smallest diameter slightly less than the diameter of the axial wall 152 so that the natural bias or resiliency of the elastomer holds the lip 148 snugly in contact with the axial wall 152. The fluid barrier will maintain a pressure differential created by a partial vacuum in the vacuum chamber 12. With the primary lip 148 being directed obliquely, the force with which the lip 148 bears against the axial wall 152 of the inner case 122 will increase in the presence of a partial vacuum in the chamber 12, owing to the force exerted by atmospheric air on back face of the lip 148.

In contrast to the primary lip 148, the labyrinth 140 possesses a diameter slightly greater than the diameter of the axial wall 152 for the inner case 122. As a consequence, a gap of perhaps 0.001 to 0.030 inches exists between the circumferential face 144 of the labyrinth 140 and the axial wall 152 of the inner case 122. Even so, grease which migrates along the axial wall 152 when the bearing 8 is in operation encounters the pumping cavities 146 in the labyrinth 140 and, owing to the triangular or wedge-shaped configuration of those cavities, is pumped back to the interior of the bearing 8.

The seal element 130 for the inner case 122 is bonded almost entirely to the axially directed portion 158 of the longer radial wall 156 for the case 122. It includes a secondary lip 160 which is directed obliquely outwardly and at its free end bears against the axial wall 132 of the outer case 120, establishing a live fluid barrier along that wall. Like the other fluid barriers, the fluid barrier established by the lip 160 will hold a pressure differential created by a partial vacuum in the chamber 12. The lip 160 is molded with a diameter slightly greater than the diameter of the axial wall 132, so the resiliency of the elastomer holds it against the wall 132 with some force. The inclination of the lip 160 is such that a pressure differential created by a partial vacuum in the chamber 12 and in the space generally enclosed by the two seal cases 120 and 22 will cause atmospheric air, acting on the back face of the lip 160, to urge the lip 160 against the axial wall 132 with even greater force. The front face of the lip 160 is of course exposed to the space between the two cases 120 and 122 and beyond that space to the interior of the bearings 8. Being on the inner case 122, the secondary lip 160 flexes independently of the primary lip 148 and the tertiary lip 150 which are on the outer case 120.

In addition to the lip 160, the seal element 130 includes a bumper 162 which lies beyond the end edge of the axially directed portion 158 of the inner case 122, in effect representing an extension of the portion 158. The bumper 162 is presented toward the inwardly directed wall 136, with the spacing between the bumper 162 and the wall 136 being less than the spacing between the primary lip 148 and the longer radial wall 156 of the inner case 122. As a consequence, the bumper 162 serves as a stop which prevents the primary lip 148 from encountering the longer radial wall 156 of the inner case 122 should the inner case 122 be advanced too far over the thrust rib 82 on which it is mounted. Apart from that, the bumper 162 serves to limit the extent that the longer radial wall 156 may deflect toward the inwardly directed wall 136 of the outer case 120 in the presence of a pressure differential across the wall 156. Indeed, it limits the deflection to the elastic range of the metal, so that the inner case 122 does not take on a permanent deformation.

In the operation of the assembly A, the hub 6 rotates easily relative to the steering knuckle 2 owing to the bearing 8 which is located between them. The seals 100 and 102 at the ends of the bearing 8 retain grease within the interior of the bearing 8, so that the rollers 66 remain adequately lubricated as they roll along the raceways 76 of the outer race 60 and the raceways 80 of the two cones 62 and 64.

To engage the drive axle 4 with the hub 6 and thereby transfer torque from the axle 4 to the hub 6, air is evacuated from the chamber 12, thereby placing the chamber 12 under a partial vacuum. The orientation of the lips on the outer and inner cases 104 and 106 of the inboard seal 100 allows air to escape from the interior of the bearing 8 into the vacuum chamber 12. However, the orientation of the lips 148, 150 and 160 on the cases 120 and 122 of the outboard seal 102 prevents atmospheric air from entering the interior of the bearing 8. As a consequence, the interior of the bearing 8 likewise exists under a partial vacuum—indeed, essentially at the same pressure as the vacuum chamber 12.

Each of the seal lips 148, 150 and 160 alone possesses enough strength and integrity to hold the partial vacuum in the interior of the bearing 8 and the chamber 12. Initially, the pressure differential at the outboard seal 102 exists across the primary lip 148. The air within the space between the primary and secondary seal lips 148 and 160, which in the space generally enclosed by the two seal cases 120 and 122, is initially at atmospheric pressure, and it urges the primary lip 148 against the axial wall 152 of the inner case 122 with even greater force than the natural resiliency of the elastomer from which the lip 148 is molded. When the bearing 8 approaches rest and likewise when it commences rotation from a state of rest, a slight amount of grease will migrate under the labyrinth 140 and lubricate the primary seal lip 148, thus maintaining a film of lubrication between the lip 148 and the axial wall 152 of the inner case 122. This prevents the lip 148 from overheating, notwithstanding the increased force applied to it by reason of the pressure differential, and this in turn prolongs the life of the seal lip 148.

Should the primary lip 148 fail in the sense that it no longer maintains the partial vacuum, the pressure differential will shift to the secondary lip 160. The region between that lip 160 and the drive flange 52 for the hub 6 will exist at atmospheric pressure, and the air in that region will bear against the secondary lip 160 and urge it against the axial wall 132 of the outer case 120 with even greater force than that derived from the natural bias of the elastomer from which the lip 160 is molded.

Should the secondary lip 160 in time fail to maintain the partial vacuum, the tertiary lip 150 will assume that role, and the pressure differential will exist across it. In this regard, the back face of the tertiary lip 150 is exposed to atmospheric air, which will force the lip 150 against the sealing surface 58 of the drive flange 52 with even greater force than that derived from the natural resiliency of the elastomer from which the lip 150 is molded.

The three live fluid barriers created by the outboard seal 102 make it useful for applications in which no pressure differential exists, yet formidable barriers to the ingress of contaminants are required. The bearings for the front wheels of off road vehicles represent one such application. Indeed, the outboard seal 102, owing to the formidable dynamic fluid barriers that it establishes, has utility even when pressure differentials are not created or needed. Thus, it is well-suited for use in bearings exposed to more than the usual amount of dirt and water.

Figure 4:
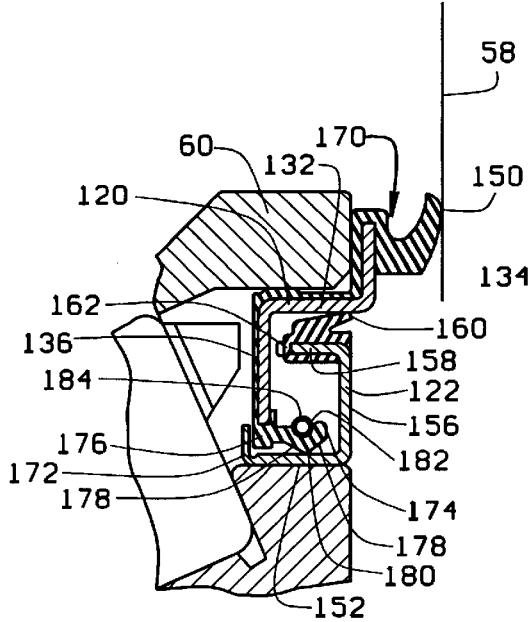
FIG. 4 is an enlarged sectional view of a modified seal.

A modified outboard seal 170 (FIG. 4) is very similar to the outboard seal 102. It has an outer case 120 provided with an axial wall 132 and radial walls 134 and 136. Likewise, it has an inner case 122 provided with an axial wall 152 and a radial wall 156, with the latter having an axially directed portion 158. The outer case 120 and inner case 122 for the modified seal 170 are essentially the same as their counterparts for the seal 102, except that their axial walls 132 and 152 are slightly longer, and the same holds true for the axially directed portion 158 on the inner case 122. Consequently, the modified seal 170 is somewhat longer than the seal 102.

The modified seal 170 also has a secondary lip 160 and bumper 162 and a tertiary lip 150 which corresponds in configuration and location to their counterparts in the seal 102.

Whereas the seal 102 has an inner seal element 124 provided with the short primary lip 148 projected from the pumping labyrinth 140, the modified seal 170 has an inner seal element 172 which has a much longer primary lip 174 to establish a more formidable fluid barrier along the axial wall 152 of the inner case 122. To this end, the inner seal element 172 for the seal 170, in addition to its extended primary lip 174 has a pumping labyrinth 176 which is very similar to the labyrinth 140. The lip 174 projects generally axially from the labyrinth 176 and has beveled surfaces 178 which converge to an edge 180 along which the lip 174 bears against the axial wall 152 of the inner case 122. Behind the edge, the lip 174 has an outwardly opening groove 182 which contains a garter spring 184. While the natural bias of the elastomer from which the lip 174 is molded urges the lip 174 against the axial wall 152 of the inner case 122, the spring 184 supplements the force so exerted, insuring that the edge 180 of the primary lip remains snugly against the axial wall 152.

Some wheel mounting assemblies do not have a sealing surface 58, much less any generally radially directed surface close enough to the end of the bearing 8 for the tertiary lip 150 of the seal element 126 to contact. For example, in the absence of the vacuum-operated clutch 10, the vacuum chamber 12 is unnecessary, and the same holds true with regard to the seal ring 26 and vacuum seal 40. With the seal ring 26 and seal 40 omitted, the inboard end of the bearing 8 is likewise exposed to road contaminants and requires an extra measure of protection. Moreover, the machining operation required to provide a surface smooth enough to effect a fluid barrier with the tertiary lip 150 adds to the overall cost of manufacturing the hub 6. Either of the multibarrier seals 102 and 170 or variations of them may be installed in the end of the bearing 8, even when the wheel mounting assembly does not provide a generally radially directed surface against which the tertiary lip 150 can bear. Indeed, the seal may provide its own radially directed surface.

To this end, the multibarrier seal is fitted with a carrier 190 (FIG. 5) in which the inner case 122 is captured. The carrier 190 projects both axially and radially from the inner case 122 and indeed extends radially beyond the outer case 120. Yet it lies close enough to the outer case 120 for the tertiary lip 150 to bear against it and establish a fluid barrier. Like the two cases 120 and 122, the carrier 190 is preferably formed as a metal stamping and as such possesses a measure of resilience. When used with the carrier 190, the multibarrier seal requires only minor modifications, and they reside in the inner case 122. The diameter of the inner axial wall 152 for the case 122 is slightly enlarged to accommodate the carrier 190, a portion of which fits between the thrust rib 84 of the bearing cone 62 and the inner wall 152, and the short radial wall 154 is omitted.

The carrier 190 includes an inner axial wall 192 that fits over the thrust rib 82 at the end of the outboard cone 64, there being an interference fit between the wall 192 and the cylindrical surface 86 of the rib 82. The inner axial wall 152 of the inner case 122 in turn fits over the inner axial wall 192 of the carrier 190, again with an interference fit. Hence, the axial wall 152 needs to be slightly larger to accommodate the wall 192 of the carrier 190. The interference fits create static fluid barriers and of course firmly position the carrier 190 and inner case 122 on the cone 64. At its ends the inner axial wall 192 of the carrier 190 merges into radial walls 194 and 196 which are directed outwardly away from the thrust rib 82 of the cone 64. The radial wall 194 lies closest to the rollers 66, and it is presented toward the pumping cavities 146 in the labyrinth 140 for the seal element 124 on the inner case 122. The other radial wall 196 lies along and against the radial wall 156 of the inner case 122. Thus, the inner case 122 of the seal 102 is captured between the two radial walls 194 and 196 of the carrier 190. The radial wall 194, which lies inside the bearing 8, is thinner than the wall 196 which is exposed outside the bearing 8.

The exposed radial wall 196 of the carrier 190 merges into an axially directed connecting wall 198, which in turn merges into an intermediate radial wall 200 which extends outwardly slightly beyond the axial wall 132 of the outer case 120. Moreover, it lies axially slightly beyond the inner portion of the seal element 126, but not beyond the tertiary lip 150 on the element 126. In this region the intermediate radial wall 200 merges into another connecting wall 202 which is directed axially, still further beyond the end of the bearing 8.

The outer connecting wall 202 merges into an outer radial wall 204 which extends outwardly past the tertiary lip 150 of the seal element 126, yet lies close enough to the lip 150 to deflect it axially toward the end of the bearing 8. Thus, owing to the natural resiliency of the elastomer from which seal element 126 is formed, the tertiary lip 150 bears against outer radial wall 204 of the carrier 190 and establishes a dynamic fluid barrier with the wall 204.

The outer radial wall 204 extends past the outwardly presented surface of the outer race 60, that is past the surface from which the flange 70 projects. Here the outer radial wall merges into an oblique return wall 206 that extends generally axially and encircles the end portion of the outer race 60. It serves as a flinger to keep contaminants away from the seal.

Figure 5:
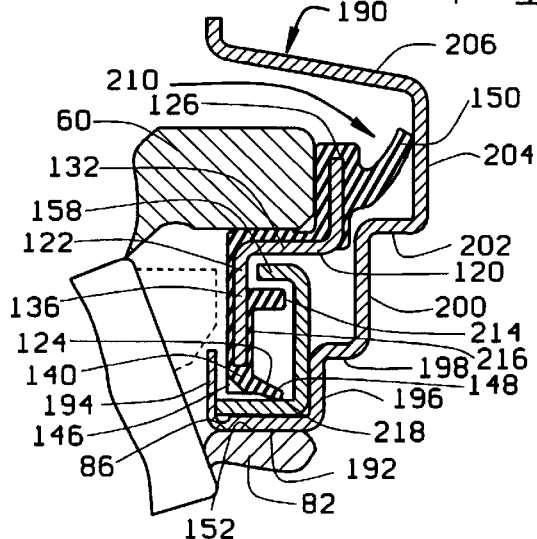
FIG. 5 is an enlarged sectional view of another modified seal fitted with a carrier.
Figure 6:
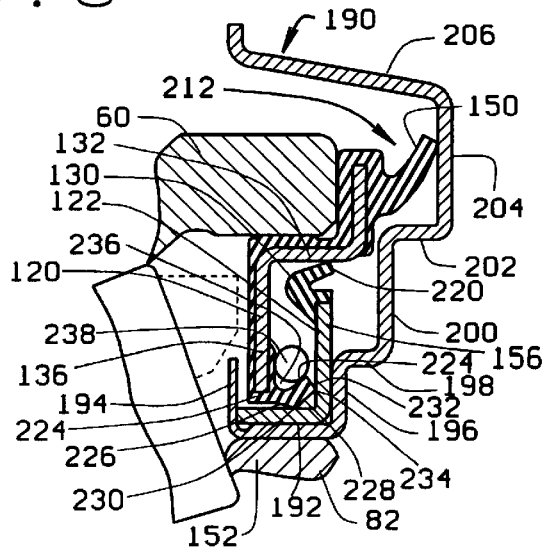
FIG. 6 is an enlarged view of still another modified seal fitted with a carrier.

The carrier accommodates either of the seals 102 or 170. Other modified seals 210, 212 may be used with or without the carrier 190 (FIGS. 5 & 6).

The modified seal 210 (FIG. 5), in lieu of the seal element 130, relies for its intermediate fluid barrier on a labyrinth established by the outer axially directed portion 158 of the inner case 122 and the axial wall 132 of the outer case 120 augmented by the axially directed portion 158 and a rib 214 that projects from the inwardly directed wall 136 of the outer case 120. The rib 214 is formed from an elastomer which is bonded to the inwardly directed wall 136. Actually, the rib 214 and the seal element 124 are joined together with another liner 216, so the rib 214, the seal element 124 and the seal element 126 are united in a single elastomeric molding. The axially directed portion 158 of the inner case 122 may be out of round or eccentric with respect to the inner axial wall 152 of the case 122 so as to pump any fluid which enters that labyrinth.

The other modified seal 212 (FIG. 6) possesses a somewhat simpler inner case 122 in that it omits axially directed portion 158 from the longer radial wall 156 of that case 122. Indeed, the wall 156 simply terminates at an edge which is presented outwardly toward the axial wall 132 of the outer case 120. The seal element 130 is bonded to this edge and to the face of the wall 156, and to this end assumes a slightly modified configuration. Yet it has a lip 220 which is directed obliquely toward and bears against axial wall 132 of the outer case 120, with the orientation being such that an elevated pressure beyond the lip 220, that is between it and the tertiary lip 150, will force the lip 220 more tightly against the axial wall 132.

The other seal element 124 also has a primary lip 224 that differs somewhat from the primary lip 148 of the seal 102 and the primary lip 174 of the seal 170 as well. The lip 224 projects generally axially from the inwardly directed wall 136 of the outer case 104 beyond which it has two beveled surfaces 226 and 228 which converge toward an edge 230 that is projected toward and bears against the inner axial wall 152 of the inner case 122. The surface 228 also converges with another beveled surface 232, and the intersection of the two creates another edge 234 which projects axially toward and bears against the radial wall 156 of the inner case 122. Opening out of the back face of the primary lip 224 is a groove 236 which receives a garter spring 238. The groove 236 is configured such that the spring 238 does not bottom out in it, but instead spans the groove 236, bearing against both of its sides. Indeed, on one side of the groove 236, the spring 184 bears against the primary lip 224 in the region generally behind the axially directed edge 234. This has the effect of urging the edge 234 against the radial wall 156 of the inner case 122 and also urging the edge 230 against the inner axial wall 152 of the case 122. Thus, the primary lip 224 establishes two dynamic fluid barriers with the inner case 122.

The tertiary lip 150 for any of the seals 102, 170, 210 or 212, may be configured to bear against a generally axially directed wall on the carrier 190, such as the oblique return wall 206. Or the carrier 190 itself may be reconfigured to provide an axially directed wall against which a reconfigured tertiary lip 150 may bear. Indeed, the tertiary lip 150 of any of the seals 102, 170, 210 or 212 may be configured to bear against a radial surface as shown, or an oblique surface, or even an axial surface, the directional reference of course being to the axis X.

This invention is intended to cover all changes and modifications of the example of the invention herein chosen for purposes of the disclosure which do not constitute departures from the spirit and scope of the invention.

What is claimed is:

1. A seal for establishing dynamic fluid barriers around an axis of rotation, said seal comprising: an outer case having an axial wall and a radial wall directed inwardly from the axial wall; an inner case located generally within the outer case and having an axial wall and a radial wall directed outwardly from the axial wall; the radial wall of the inner case being spaced axially from the radial wall of the outer case; a first seal element carried by the radial wall of the outer case and establishing a fluid barrier with the axial wall of the inner case; a second seal element carried by the radial wall of the inner case and cooperating with the outer case to establish another fluid barrier that is located radially outwardly from the fluid barrier established by the first seal element, and a third seal element carried by the outer case and having a lip located radially outwardly from the second seal element, the lip of the third seal element projecting beyond the radial walls of the two cases and being configured to establish a dynamic fluid barrier with a surface located axially beyond the radial walls of the two cases.

2. A seal according to claim 1 wherein the lip of the third seal element is oriented obliquely with respect to the axis, projects obliquely outwardly beyond the radial walls of the two cases, and is configured to effect a face seal with a surface that is oriented at an angle with respect to the axis and is located axially beyond the radial walls of the two cases.

3. A seal according to claim 1 wherein the first seal element includes a lip which contacts the axial wall of the inner case.

4. A seal according to claim 3 wherein the first seal element also includes a labyrinth which lies along, but is spaced slightly away from the axial wall of the inner case.

5. A seal according to claim 4 wherein the labyrinth has pumping formations configured to pump lubricant away from the lip of the first seal element when relative rotation about the axis occurs between the labyrinth and the axial wall of the inner case.

6. A seal according to claim 1 wherein the second seal element includes a lip which contacts the axial wall of the outer case.

7. A seal according to claim 1 and further comprising a carrier to which the inner case is fitted, the carrier projecting outwardly away from the axis and past the lip of the third seal element, the carrier providing the surface against which the lip of the third seal element bears to establish a fluid barrier.

8. A seal according to claim 7 wherein the surface of the carrier against which the lip of the third seal element bears is directed generally radially.

9. A seal according to claim 1 wherein each of the lips is mounted such that it flexes independently of the other lips so that the flexure of anyone lip will not affect any of the other lips.

10. A seal for establishing a dynamic fluid barrier around an axis of rotation, said seal comprising: an outer case having an axial wall and a radial wall directed inwardly from the axial wall; an inner case located generally within the outer case and having an axial wall and a radial wall directed outwardly from the axial wall; a primary lip carried by the radial wall of the outer case and contacting the axial wall of the inner case to effect a live fluid barrier with the inner case; a secondary lip carried by the radial wall of the inner case and contacting the axial wall of the outer case to effect a live fluid barrier with the outer case; and a tertiary lip located radially outwardly from the secondary lip and carried by the outer case for effecting a live fluid barrier with a surface that is presented at an angle with respect to the axis; and wherein each of the lips is oriented such that when an elevated pressure exists at one end of the seal and the lip is exposed to that elevated pressure, the lip will bear with greater force against the axial wall or surface that the lip contacts.

11. A seal according to claim 10 wherein the secondary lip is located radially outwardly from the primary lip.

12. A seal according to claim 10 wherein the outer case has another radial wall, and the tertiary lip is attached to the other radial wall.

13. A seal according to claim 12 wherein the radial walls of the outer case are at opposite ends of the axial wall for that case, and the radial wall to which the tertiary lip is attached is directed outwardly away from the axis.

14. The seal of claim 12 in combination with a generally radially directed surface; wherein the tertiary lip bears, by reason of its resiliency, against the radially directed surface to effect a dynamic fluid barrier with the surface; wherein the tertiary lip has a back face which when subjected to an elevated pressure urges the tertiary lip with greater force against the radial surface; and wherein the tertiary lip is oriented such that its back face is exposed to an elevated pressure from the same end of the seal to which the secondary and primary lip are exposed to the elevated pressure.

15. A seal comprising: inner and outer cases arranged around an axis of rotation with the inner case generally being within the outer case, a first seal lip attached to one of the cases and establishing a dynamic fluid barrier with the other case; seal means for establishing another dynamic fluid barrier between the cases with the fluid barrier established by the seal means being located radially outwardly from the fluid barrier established by the first lip; a carrier fitted to the inner ease in a fixed position with respect thereto such that a static fluid barrier exists between the inner case and the carrier, the carrier providing a sealing wall that is directed generally radially and is presented axially beyond the outer case; and a second seal lip attached to the outer case and projecting toward and contacting the sealing wall of the carrier which deflects the second lip, the second lip establishing another fluid barrier with the carrier; the seal means being located between the first and second seal lips.

16. A seal according to claim 15 wherein the seal means is a lip that is attached to one of the cases and bears against the other case.

17. A seal according to claim 15 where the second seal lip is located radially outwardly from the fluid barrier established by the seal means.

18. A seal for establishing a dynamic fluid barrier around an axis of rotation, said seal comprising: an outer case having an axial wall and a radial wall directed inwardly from the axial wall; an inner case located generally within the outer case and having an axial wall and a radial wall directed outwardly from the axial wall; a carrier to which the inner case is fitted, the carrier projecting outwardly away from the axis and providing a generally radially directed surface; a primary lip carried by the radial wall of the outer case and contacting the axial wall of the inner case to effect a live fluid barrier with the inner case; a secondary lip carried by the radial wall of the inner case and contacting the axial wall of the outer case to effect a live fluid barrier with the outer case; and a tertiary lip carried by the outer case and bearing against the radial surface of the carrier for effecting a live fluid barrier with the carrier which projects outwardly past the tertiary lip; and wherein each of the lips is oriented such that when an elevated pressure exists at one end of the seal and the lip is exposed to that elevated pressure, it will bear with greater force against the axial wall or surface that the lip contacts.

19. A seal according to claim 18 wherein the primary lip and secondary lip are inclined with respect to the axial walls which they contact such that the regions at which they are attached to their respective radial walls are offset from the regions at which they contact their respective axial walls, whereby each has a back face.

20. A seal according to claim 18 wherein each of the lips is mounted such that it flexes independently of the other lips so that the flexure of anyone lip will not affect any of the other lips.

21. In combination with a bearing for facilitating rotation about an axis and including an outer race having a raceway presented inwardly toward the axis, an inner race having a raceway presented toward, yet spaced from the raceway of the outer race, whereby the bearing has a generally annular interior between the races, and rolling elements located in a row in the bearing interior and contacting the raceways, so that the rolling elements will roll along the raceways when one race rotates relative to the other race, the annular interior being subjected to pressures less than the ambient pressure surrounding the bearing; an improved seal for closing an end of the bearing to sustain a pressure differential and maintain a reduced pressure within the interior of the bearing, said seal comprising: an outer case fixed in position with respect to the outer race such that a static fluid barrier exists between the outer case and the outer race; an inner case fixed in position with respect to the inner race such that a static fluid barrier exists between the inner case and the inner race; a first elastomeric seal element attached to one of the cases and having a primary seal lip that bears against and establishes a dynamic fluid barrier with the other case; a second elastomeric seal element attached to one of the cases and having a secondary lip which bears against the other case and establishes a dynamic fluid barrier with the other case; a third elastomeric seal element on one of the cases and having a tertiary lip that projects axially beyond the cases; and a carrier attached to the case other than the one to which the third seal element is attached, the carrier providing a sealing surface against which the tertiary lip bears to establish a dynamic fluid barrier with the sealing surface, the sealing surface being directed generally radially with respect to the axis; and wherein the secondary lip is located between the primary and tertiary lips, wherein each of the lips has front and back faces on opposite sides of the fluid barrier formed by the lip, and wherein each lip is oriented such that when its front face is exposed to air at reduced pressure by reason of being in communication with the interior of the bearing, air at the ambient pressure will act upon the back face of the lip to urge the lip with greater force against that which it bears against to enhance the dynamic fluid barrier established by the lip.

22. The combination according to claim 21 wherein one of the lips is attached to one of the cases and the other two lips are attached to the other case.

* * * * *